US010275826B1

(12) United States Patent
Ley et al.

(10) Patent No.: US 10,275,826 B1
(45) Date of Patent: Apr. 30, 2019

(54) HIDDEN MONEY FOLDERS

(75) Inventors: Michael Ley, Moon Township, PA (US); Christopher Michael Bajgier, Allison Park, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

(21) Appl. No.: 12/121,943

(22) Filed: May 16, 2008

(51) Int. Cl.
*G06Q 40/00* (2012.01)
(52) U.S. Cl.
CPC .................................. *G06Q 40/00* (2013.01)
(58) Field of Classification Search
USPC ....................................................... 705/35, 39
See application file for complete search history.

(56) References Cited

U.S. PATENT DOCUMENTS

| | | | | |
|---|---|---|---|---|
| 3,970,992 | A * | 7/1976 | Boothroyd et al. | 705/43 |
| 6,282,523 | B1 * | 8/2001 | Tedesco | G06Q 20/04 235/379 |
| 2002/0123949 | A1 | 9/2002 | VanLeeuwen | |
| 2003/0009402 | A1 * | 1/2003 | Mullen | G06Q 20/04 705/35 |
| 2003/0023549 | A1 * | 1/2003 | Armes et al. | 705/40 |
| 2004/0039701 | A1 * | 2/2004 | Nakamura et al. | 705/42 |
| 2005/0027654 | A1 * | 3/2005 | Adrian | G06F 17/60 705/40 |
| 2005/0075075 | A1 * | 4/2005 | Wechter et al. | 455/67.11 |
| 2005/0222951 | A1 * | 10/2005 | Sherman | 705/40 |
| 2006/0232041 | A1 * | 10/2006 | Chen | B62K 19/00 280/281.1 |
| 2007/0185796 | A1 | 8/2007 | Kingshott et al. | |
| 2007/0198382 | A1 * | 8/2007 | Ferrari | 705/35 |
| 2009/0063332 | A1 * | 3/2009 | Tabaczynski | G06Q 20/10 705/39 |
| 2009/0083700 | A1 * | 3/2009 | MacPhail | 717/107 |

FOREIGN PATENT DOCUMENTS

JP             54156600 A   * 12/1979

OTHER PUBLICATIONS

Budget the Old Envelope System; [Final Edition] Michelle Singletary. The Washington Post. Washington, D.C.: Jun. 10, 2007.*
Personal-Finance Tips Kathy Yakal. PC Magazine. New York: May 6, 2003. vol. 22, Iss. 8; p. 82.*
Yakal (Personal Finance Tips, PC Magazine).*
Irons, Richard, What is Envelope Budgeting—Why the Envelope Budgeting System is so Effective?, http://www.mvelopes.com/articles/envelope-budgeting.php, accessed on Feb. 15, 2008.

* cited by examiner

*Primary Examiner* — William E Rankins
(74) *Attorney, Agent, or Firm* — Buchanan Ingersoll & Rooney PC; Robert J. Pugh

(57) ABSTRACT

A computer-assisted method for segregating funds within an existing financial account by a user of the account. The method includes creating at least one separate folder that is hidden from the user and allocating a user-specified amount of funds to the separate folder from the existing financial account. The method also includes transferring an amount of funds from the separate folder to the existing financial account upon occurrence of a user-specified goal.

13 Claims, 3 Drawing Sheets

HIDDEN MONEY FOLDERS

BACKGROUND

In recent years personal savings rates have continued to decline and the amount of debt has continued to rise in the United States. Many customers of financial institutions have one primary bank account from which they conduct all of their financial transactions, including paying bills, discretionary spending, saving, etc. The abundant availability of ATMs and credit and debit cards makes consumer spending convenient, resulting in easy depletion of funds available for other expenses and leaving no funds available for savings. As mobile networks and on-line banking continue to expand, financial customers want easy, identifiable transactions as well as immediate access to available funds. To meet this demand and to encourage personal savings by their customers, financial institutions are constantly improving their electronic and on-line banking services. Still, there is a need for simplified and effective methods of budgeting and saving for customers using one primary account or a small number of accounts for all their financial transactions.

SUMMARY

In one general aspect, embodiments of the present invention pertain to a system and method of segregating funds within a primary financial account for personal savings and budgeting. Embodiments of the present invention allow a user to allocate funds to a separate, hidden money folder within a primary financial account until a set goal amount of funds in the folder or a set amount of time has been achieved, after which the amount of funds in the hidden folder is transferred back into the available funds within the primary account.

In various embodiments the present invention is directed to a computer-assisted method for segregating funds within an existing financial account by a user of the account. The method includes creating at least one separate folder that is hidden from the user and allocating a user-specified amount of funds to the separate folder from the existing financial account. The method also includes transferring an amount of funds from the separate folder to the existing financial account upon occurrence of a user-specified goal.

Those and other details, objects, and advantages of the present invention will become better understood or apparent from the following description and drawings showing embodiments thereof.

BRIEF DESCRIPTION OF THE DRAWINGS

Various embodiments of the present invention are described herein by way of example in conjunction with the following figures, wherein.

DESCRIPTION

In general, various embodiments of the present invention are directed to systems and methods relating to electronic or online (e.g., Internet) banking services offered to customers by financial entities that provide for personal budgeting and saving. The systems and methods, in various embodiments, allow a user of a financial account, such as a checking account, an investment account, a savings account, etc., to organize funds, budget, and save. The systems and methods, in various embodiments, allow the user to create a segregated, hidden (i.e. invisible) folder, for example a "ghost" folder, in which to allocate funds from the available funds within the primary account, wherein the allocated funds are no longer available for withdrawal or other disposition in the available funds of the primary account.

Various embodiments of the present invention allow the user to designate the folder for a specific purpose and to create multiple folders. Various embodiments of the present invention allow the user to specify a predetermined goal amount of funds for the folder or an amount of time in which to allocate funds to the folder. Various embodiments of the present invention allow the user to allocate funds according to a user-created savings rule or through automatic withdrawal or transfer into the hidden money folder. After the goal amount of funds has been achieved or the predetermined time period has expired, the amount of funds within the folder is transferred back into the available fluids within the primary account. Optionally, a message is sent to the user, for example via email or SMS text message, indicating the amount of the transfer and the amount of available funds.

Figure 1:
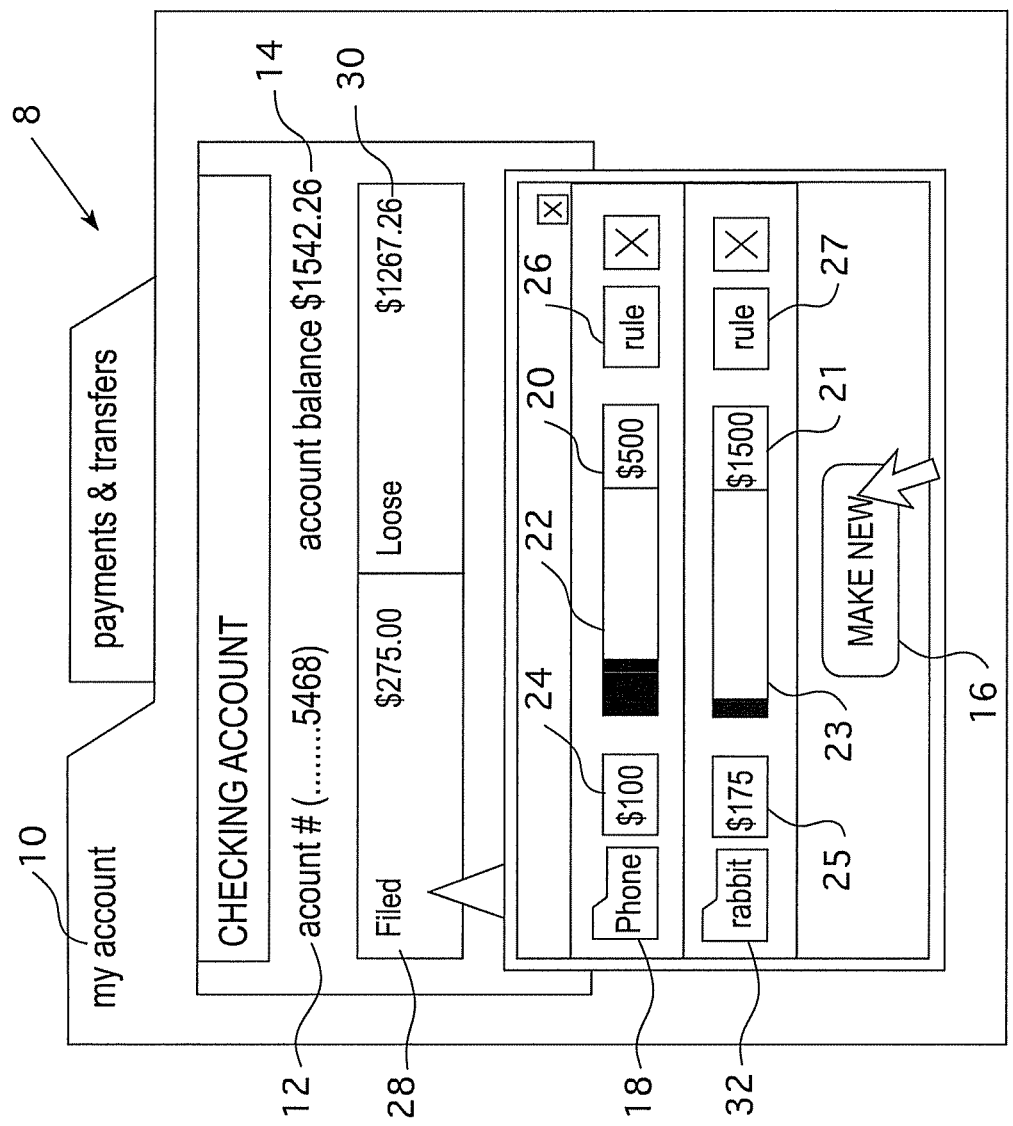
FIG. 1 illustrates a screen shot of an online or electronic banking interface in which embodiments of the present invention may be used.

FIG. 1 illustrates a screen shot of an online or electronic banking interface 8 in which embodiments of the present invention may be used. As can be seen, a user has access to an existing primary financial account 10, such as a checking account, an investment account, a savings account, etc., which is identified by an account number 12. The account 10 has an available amount of funds, i.e. an account balance 14. The interface has an icon 16 for creating a new folder within the primary account 10 by the user. In one embodiment, when the user selects the icon 16, the user may specify that the newly created folder is a hidden folder that will not appear on the interface.

Folders 18, 32 may be designated by the user and a predetermined goal amount of funds 20, 21 may be set by the user for each folder 18, 32. In the interface, the amount of funds 24, 25 in the folders 18, 32 is displayed along with graphical representations 22, 23 depicting the amounts saved in proportion to the goal amounts 20, 21. In one embodiment, the user can create a savings rule using icons 26, 27 for allocating funds to the folders 18, 32. In another embodiment, the user can create an automatic withdrawal or transfer into the folders 18, 32 at, for example, periodic intervals. The interface 8 displays the total amount filed 28 in the folders 18, 32 as well as the difference, or "loose" funds 30, between the account balance 14 and the "filed" amount 28. Multiple folders can be created within the primary account 10 using the interface 8, thus allowing the user to organize, budget, and save money. For example, the user could allocate money for paying bills or saving for vacations or special purchases. In one embodiment, a hidden folder may be created by the user so that the user may allocate funds to the hidden folder, thus rendering the funds no longer available for withdrawal or other disposition.

Figure 2:
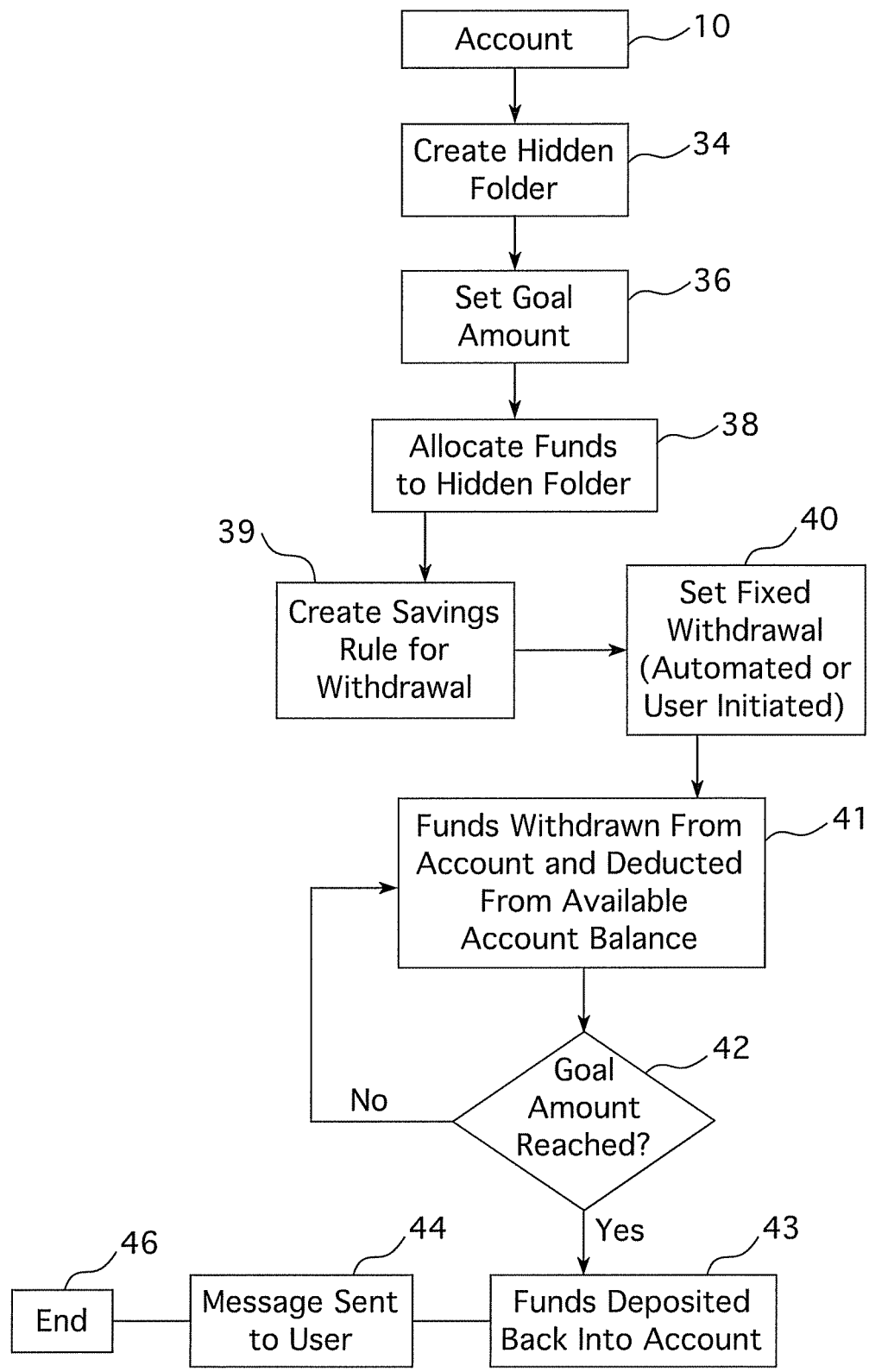
FIG. 2 illustrates a flowchart of an embodiment of a method for creating and using a hidden money folder for personal savings within an existing primary financial account.

FIG. 2 illustrates a flowchart of an embodiment of a method for creating and using a hidden (i.e., invisible) money folder, for example a "ghost" folder, for personal savings within the financial account 10. At step 34, the user creates a segregated, hidden "ghost" folder using the icon 16. The user designates the folder as a hidden money folder during creation. In one embodiment, the user may designate the folder as being hidden by selecting an icon on the interface 8 that is specific for creating hidden folders. At step 36, the user sets a predetermined goal amount of funds or, as an alternative, sets a goal amount of time for saving funds in the hidden folder. At step 38, the user allocates funds from the available funds within the account 10 or the "loose" funds 30. The user may create a savings rule at step 39 for allocating funds to the hidden folder. In one embodiment, the user may set a fixed automatic withdrawal at step 40. In another embodiment, the user can transfer funds to the hidden folder at any time. In one embodiment, such a transfer may be accomplished using an automated teller machine (ATM). In one embodiment, funds transfers may be made into the hidden folder by a third party (e.g., a relative may contribute to a hidden folder as a way of making a gift).

Figure 3:
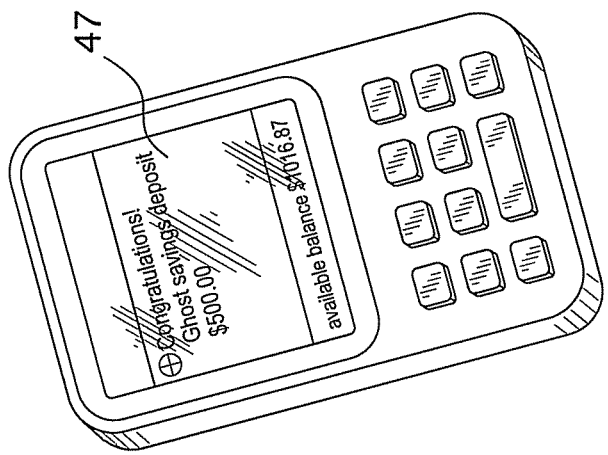
FIG. 3 illustrates an embodiment of the present invention in which a message is sent to a user of a primary financial account upon transfer of an amount of funds from a hidden money folder to the available funds within the primary account when a savings goal has been achieved.

At step 41, the funds allocated to the hidden folder are withdrawn and deducted from the available finds in the account 10, i.e. account balance 14. The user cannot see and therefore will not withdraw or otherwise dispose of the segregated funds in the hidden folder. After the goal amount of funds has been reached or the predetermined time period for saving funds has expired as determined at step 42, the funds in the hidden folder are transferred at step 43 back into the available funds within the account 10. In one embodiment shown in FIG. 3 at step 44, a message 47 is sent to the user via, for example, email or an SMS text message indicating the amount of the transfer and the amount of funds available 14 within the account 10 and/or the "loose" funds available 30. In one embodiment, the user is notified via an automated teller machine (ATM) message that the goal amount of funds has been reached or the predetermined time period for saving funds has expired. In one embodiment, the funds in the hidden folder are credited to a pay card, or gift card, which is sent (e.g., by mail) or given to the user. The process ends at 46. In various embodiments, the user may access the hidden folder by supplying, for example, a password, in the event that the user needs to access the funds the in the hidden folder.

Figure 4:
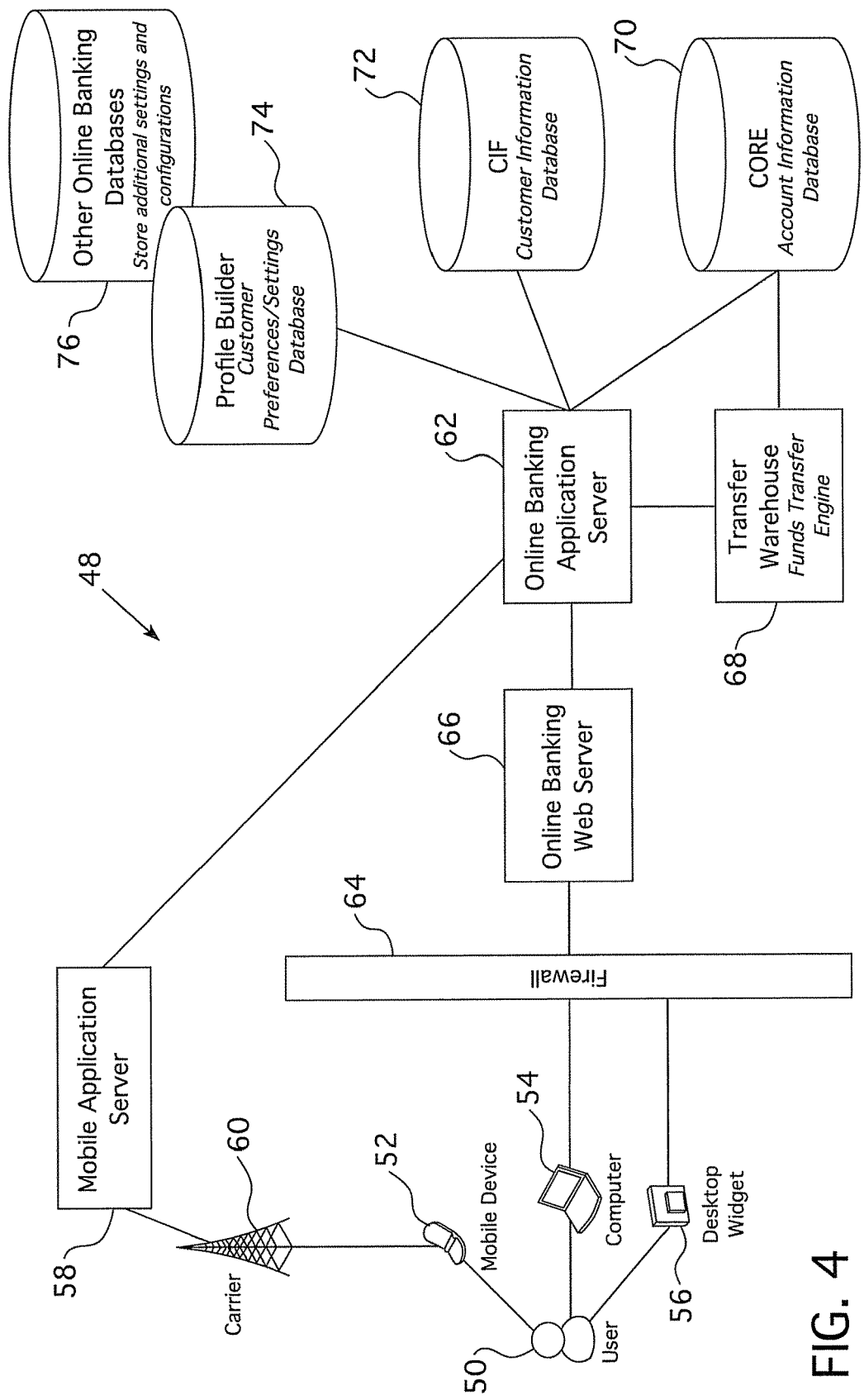
FIG. 4 illustrates an embodiment of a system in which embodiments of the present invention may be used.

FIG. 4 illustrates an embodiment of a system 48 in which embodiments of the present invention may be used. A user 50 utilizes a network-enabled client device with a display having a user interface, such as a mobile device 52, a computer 54, a desktop widget 56, or any other suitable device. The mobile device 52 accesses, via a mobile application server 58 and a wireless carrier 60, an online banking application server 62 (i.e., a host system of the existing primary financial account). The online banking application server 62 or a processor may perform some or all of the steps of the methods for segregating funds within a primary financial account as described in various embodiments herein. The computer 54 and the desktop widget 56 access the online banking application server 62 via a firewall 64 protected online banking web server 66.

The online banking application server 62 is in communication with a transfer warehouse 68 (funds transfer engine), an account information database 70, a customer information database 72, a customer preferences/settings database 74, and other online banking databases 76 that store additional settings and configurations.

Various embodiments of the present invention may be implemented on computer-readable media. The terms "computer-readable medium" and "computer-readable media" in the plural as used herein may include, for example, magnetic and optical memory devices such as diskettes, compact discs of both read-only and writeable varieties, optical disk drives, hard disk drives, etc. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

What is claimed is:

1. A computer-assisted method for segregating funds within an existing financial account by a user of the account, the method comprising:
  creating, using a computer, at least one separate folder that is hidden from the user, wherein the separate folder is a folder that is segregated within the financial account;
  allocating a user-specified amount of funds to the separate folder from the existing financial account, wherein the user-specified amount of funds is no longer available for withdrawal or other disposition in the existing financial account until occurrence of a user specified goal, and wherein the withdrawal or other disposition is controlled by the computer and not by an electromechanical mechanism;
  wherein allocating a user-specified amount of funds comprises allocating a user specified amount of funds according to a user-created rule;
  displaying a difference between a total account balance and an amount in the hidden folder;
  transferring an amount of funds from the separate folder to the existing financial account upon occurrence of the user-specified goal;
  supplying a password allowing user access to funds in the hidden folder;
  generating a message for display on an automated teller machine (ATM) upon occurrence of the user-specified goal.

2. The method of claim 1, further comprising deducting the allocated amount of funds from the total account balance.

3. The method of claim 1, wherein allocating a user-specified amount of funds comprises allocating a user-specified amount of funds according to a user-specified automatic withdrawal rule.

4. The method of claim 1, further comprising sending a message to said user indicating that the transfer completed.

5. The method of claim 4, wherein sending a message includes sending a message via an email or an SMS text message.

6. A system for segregating funds within an existing financial account by a user of the account, the system comprising:
  a network-enabled client device, wherein the client device includes a display having a user interface; and
  a processor configured to:

create at least one separate folder that is hidden from the user, wherein the separate folder is a folder that is segregated within the financial account;

allocate a user-specified amount of funds to the separate folder from the existing financial account, wherein the user-specified amount of funds is no longer available for withdrawal or other disposition in the existing financial account until occurrence of a user-specified goal, and wherein the withdrawal or other disposition is controlled by the processor and not by an electromechanical mechanism;

allocate the user-specified amount of funds according to a user-created rule;

display a difference between a total account balance and an amount in the hidden folder;

transfer an amount of funds from the separate folder to the existing financial account upon occurrence of the user-specified goal;

receive a password allowing user access to funds in the hidden folder;

generate a message for display on an automated teller machine (ATM) upon occurrence of the user-specified goal; and wherein allocating the user-specified amount of funds comprises allocating a user-specified amount of funds via an automated teller machine (ATM) transaction.

7. The system of claim 6, further comprising a host system in communication with the client device via a communication network, wherein the host system comprises the existing financial account.

8. The system of claim 6, wherein the processor is further configured to deduct the allocated amount of funds from the total account balance.

9. The system of claim 6, wherein the processor is further configured to allocate a user-specified amount of funds according to a user-created rule.

10. The system of claim 6, wherein the processor is further configured to allocate a user-specified amount of funds according to a user-specified automatic withdrawal rule.

11. The system of claim 6, wherein the processor is further configured to send a message to said user indicating that the transfer completed.

12. An apparatus for segregating funds within an existing financial account by a user of the account, the apparatus comprising:

means for creating at least one separate folder that is hidden from the user, wherein the separate folder is a folder that is segregated within the financial account;

means for allocating a user-specified amount of funds to the separate folder from the existing financial account, wherein the user-specified amount of funds is no longer available for withdrawal or other disposition in the existing financial account until occurrence of a user-specified goal, and wherein the withdrawal or other disposition is controlled by a computer and not by an electromechanical mechanism;

wherein the means for allocating a user-specified amount of funds comprises means for allocating a user-specified amount of funds according to a user-created rule;

means for displaying a difference between a total account balance and an amount in the hidden folder;

means for transferring an amount of funds from the separate folder to the existing financial account upon occurrence of the user-specified goal; and means for receiving a password allowing user access to funds in the hidden folder;

means for generating a message for display on an automated teller machine (ATM) upon occurrence of the user-specified goal; and wherein the means for allocating the user-specified amount of funds comprises means for allocating a user-specified amount of funds via an automated teller machine (ATM) transaction.

13. A computer-assisted method for segregating funds within an existing financial account by a user of the account, the method comprising:

creating, using a computer, at least one separate folder that is hidden from the user, wherein the separate folder is a folder that is segregated within the financial account;

allocating a user-specified amount of funds to the separate folder from the existing financial account, wherein the user-specified amount of funds is no longer available for withdrawal or other disposition in the existing financial account until occurrence of a user-specified goal, and wherein the withdrawal or other disposition is controlled by the computer and not by an electromechanical mechanism;

wherein allocating a user-specified amount of funds comprises allocating a user-specified amount of funds according to a user-created rule;

displaying a difference between a total account balance and an amount in the hidden folder;

issuing a pay card having a value equal to an amount of funds from the separate folder upon occurrence of the user-specified goal;

receiving a password allowing user access to funds in the hidden folder;

generating a message for display on an automated teller machine (ATM) upon occurrence of the user-specified goal; and wherein allocating the user-specified amount of funds comprises allocating a user-specified amount of funds via an automated teller machine (ATM) transaction.

* * * * *